(12) United States Patent
Guegan et al.

(10) Patent No.: US 9,830,320 B2
(45) Date of Patent: Nov. 28, 2017

(54) METHOD AND DEVICE FOR ASSIGNING TIME INFORMATION TO A MULTIMEDIA CONTENT

(71) Applicant: THOMSON LICENSING, Issy de Moulineaux (FR)

(72) Inventors: Marie Guegan, Thorigne-Fouillard (FR); James Lanagan, Rennes (FR); Frederic Plissonneau, Thorigne-Fouillard (FR)

(73) Assignee: THOMSON LICENSING, Issy les Moulineax ( * ) Notice: Subject to any disclaimer, the term of this patent is extended or adjusted under 35 U.S.C. 154(b) by 563 days.

(21) Appl. No.: 14/461,486

(22) Filed: Aug. 18, 2014

(65) Prior Publication Data
US 2015/0058346 A1 Feb. 26, 2015

(30) Foreign Application Priority Data
Aug. 21, 2013 (EP) .................................... 13306163

(51) Int. Cl.
*G06F 17/30* (2006.01)
(52) U.S. Cl.
CPC .... *G06F 17/3002* (2013.01); *G06F 17/30044* (2013.01)
(58) Field of Classification Search
CPC ........................ G06F 17/3002; G06F 17/30044
See application file for complete search history.

(56) References Cited

U.S. PATENT DOCUMENTS

| 7,130,844 | B2 | 10/2006 | Elder et al. |
| 7,792,827 | B2 | 9/2010 | Amitay et al. |
| 7,813,560 | B2 | 10/2010 | Kraus et al. |
| 8,244,661 | B1 | 8/2012 | Komissarchik et al. |
| 2009/0132583 | A1 | 5/2009 | Carter et al. |
| 2009/0138457 | A1* | 5/2009 | Askey ............... G06F 17/30053 |
| 2009/0208180 | A1* | 8/2009 | Ashby .................. H04N 21/235 386/248 |
| 2010/0082624 | A1 | 4/2010 | Martin et al. |

(Continued)

OTHER PUBLICATIONS

Matthew Cooper et al., "Automatically Organizing Digital Photographs Using Time and Content", 2003, IEEE, pp. 749-752.*

(Continued)

*Primary Examiner* — Apu Mofiz
*Assistant Examiner* — Jared Bibbee
(74) *Attorney, Agent, or Firm* — Meagher Emanuel Laks Goldberg & Liao, LLP

(57) ABSTRACT

The invention concerns a device (D) for assigning time information to a main multimedia content related to a given object. To this end, said device comprises:
 a clustering module (4) configured to cluster a set of auxiliary multimedia contents with time information and related to said object, so as to deliver clusters comprising some of said auxiliary multimedia contents;
 a determining module (5) configured to determine a time data for each cluster;
 a computing module (6) configured to compute a distance between the main multimedia content and each of said clusters,
 an assigning module (7) configured to assign to the main multimedia content, the time data of the cluster having the smallest distance said amongst computed distances.

12 Claims, 3 Drawing Sheets

(56) References Cited

U.S. PATENT DOCUMENTS

| 2011/0035382 | A1  | 2/2011 | Bauer et al. | |
|---|---|---|---|---|
| 2011/0061028 | A1* | 3/2011 | Bachman | G06F 17/30058 715/862 |
| 2011/0123004 | A1* | 5/2011 | Chang | G06F 17/30026 379/88.01 |
| 2012/0082427 | A1* | 4/2012 | Andres Del Valle | H04L 65/605 386/230 |
| 2012/0136861 | A1* | 5/2012 | Lee | G06F 17/30867 707/737 |
| 2012/0148157 | A1* | 6/2012 | Kumar | G06K 9/6249 382/173 |
| 2013/0018926 | A1* | 1/2013 | Schmidt | G06Q 10/10 707/805 |
| 2013/0054262 | A1  | 2/2013 | Edwards et al. | |
| 2014/0270550 | A1* | 9/2014 | Dwan | G06K 9/00684 382/225 |

OTHER PUBLICATIONS

Mathew Cooper et al., "Temporal Event Clustering for Digital Photo Collections", Aug. 2005, ACM, pp. 269-288.*

Rogers, Everett M., "Diffusion of innovations", Third Edition, The Free Press, New York, 1983, pp. 1-413.

Blei etal: "Dynamic topic models", ICML™ 06—23rd Intl. Conference on Machine Learning; pp. 113-120; New York, New York.

Jones: "A statistical interpretation of term specificity and its application in retrieval",Journal of Documentation, vol. 23 Iss: 1, 1972, pp. 11-21.

Lavrenko etal: "Mining of concurrent text and time series", In KDD-2000 Workshop on Text Mining; pp. 37-44.

Li etal: "Incorporating Metadata into Dynamic Topic Analysis"; Baysian Modelling Applications Workshop,UAI, Catalina Island, USA, Aug. 18, 2012.

Mei etal: "Discovering evoiutionary theme patterns from text—an exploration of temporal text mining"; KDD '05—Proceedings of the eleventh ACM SIGKDD international conference on Knowledge discoveryin data mining.ACM, 2005; pp. 1-10.

Singhal etal: "Pivoted document length normalization"; Proceedings of the 19th annual international, Zurich,Switzeriand ; Aug. 18-22, 1996; pp. 1-9.

Yang et al; "Patterns of temporal variation in oniine media"; WSDM '11 —Proceedings of the fourth ACM international conference on Web search and data mining.ACM, 2011; pp. 1-10.

Search Report dated Jan. 9, 2014.

* cited by examiner

METHOD AND DEVICE FOR ASSIGNING TIME INFORMATION TO A MULTIMEDIA CONTENT

This application claims the benefit, under 35 U.S.C. §119 of European Patent Application No. 13306163.0, filed Aug. 21, 2013.

FIELD OF THE INVENTION

The present invention relates generally to multimedia contents published, for instance, over a network (such as Internet) and retrieved from the latter and, more particularly, to a method and a device for assigning a time data to such a multimedia content preferably devoid of any time information.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Among the massive amount of multimedia contents (e.g. Audio/Visual contents, audio contents, written documents as posts or comments, pictures, etc.) accessible and/or retrieved from the Internet network (e.g. through Web forums, dedicated websites, blog, etc.), some contents are associated with a time information (such as a release or publication date), but other contents do not own any time data.

For multimedia contents devoid of time information, it might be uneasy, for a given web user, to access any accurate time data with respect to such contents. The relevancy of said contents might then be assessed as much smaller than time-stamped multimedia contents, despite the fact that the matter they comprise might be valuable.

The present invention attempts to remedy at least this drawback, by providing a time data to a multimedia content that does not already have associated time information.

SUMMARY OF THE INVENTION

The invention concerns a method for assigning time information to a main multimedia content related to a given object,
which is remarkable in that it comprises the following steps of:
  clustering a set of auxiliary multimedia contents with time information and related to said object, so as to deliver clusters;
  determining a time data for each cluster;
  computing a distance between the main multimedia content and each of said clusters,
  assigning to the main multimedia content, the time data of the cluster having the smallest distance amongst said computed distances.

Thus, thanks to the present invention, it is possible to assign a determined time data to a multimedia content completely devoid of any time information. The present method does preferably not rely on any explicit time information such as a publication date of a given multimedia content. In case a given multimedia content already has time information (e.g. a publication date), the method provides an additional time data, which might be different from said time information. With such an assigned time data, the relevancy of a multimedia document initially devoid of time information can be increased and the chance to be taken into consideration, for instance by a Web user, should be higher.

According to a preferred embodiment of the present invention, the clustering step implements a temporal clustering algorithm.

Moreover, the clustering step can advantageously be based on the release date of the auxiliary multimedia contents and their own content.

In addition, the determined time data of each cluster can be the mean time obtained from the time information of the auxiliary multimedia contents defining said cluster.

In another aspect of the present invention, said method can comprise a step of determining a time interval between the release date of the given object and the assigned time data of the main multimedia content.

In particular, said method can further comprise a step of comparing the time interval of the main multimedia content with the time interval of at least one further multimedia content.

Besides, said method can also comprise a further step of positioning on a timeline the main multimedia content based on its assigned time data, the origin of the timeline being the release date of the given object.

As an example, the main and auxiliary multimedia contents are initially released on a network, and then retrieved from said network.

In addition, the present invention is further related to a device for assigning time information to a main multimedia content related to a given object.

According to the invention, said device comprises:
  a clustering module configured to cluster a set of auxiliary multimedia contents with time information and related to said object, so as to deliver clusters comprising some of said auxiliary multimedia contents;
  a determining module configured to determine a time data for each cluster;
  a computing module configured to compute a distance between the main multimedia content and each of said clusters,
  an assigning module configured to assign to the main multimedia content, the time data of the cluster having the smallest distance amongst said computed distances.

In an embodiment of the present invention, the clustering module can implement a temporal clustering algorithm.

Furthermore, the present invention also concerns a computer program product downloadable from a communication network and/or recorded on a medium readable by computer and/or executable by a processor, comprising program code instructions for implementing the steps of the method above mentioned.

In addition, the present invention concerns a non-transitory computer-readable medium comprising a computer program product recorded thereon and capable of being run by a processor, including program code instructions for implementing the steps of the method previously depicted.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 3, the represented blocks are purely functional entities, which do not necessarily correspond to physically separate entities. Namely, they could be developed in the form of software, hardware, or be implemented in one or several integrated circuits.

Figure 1:
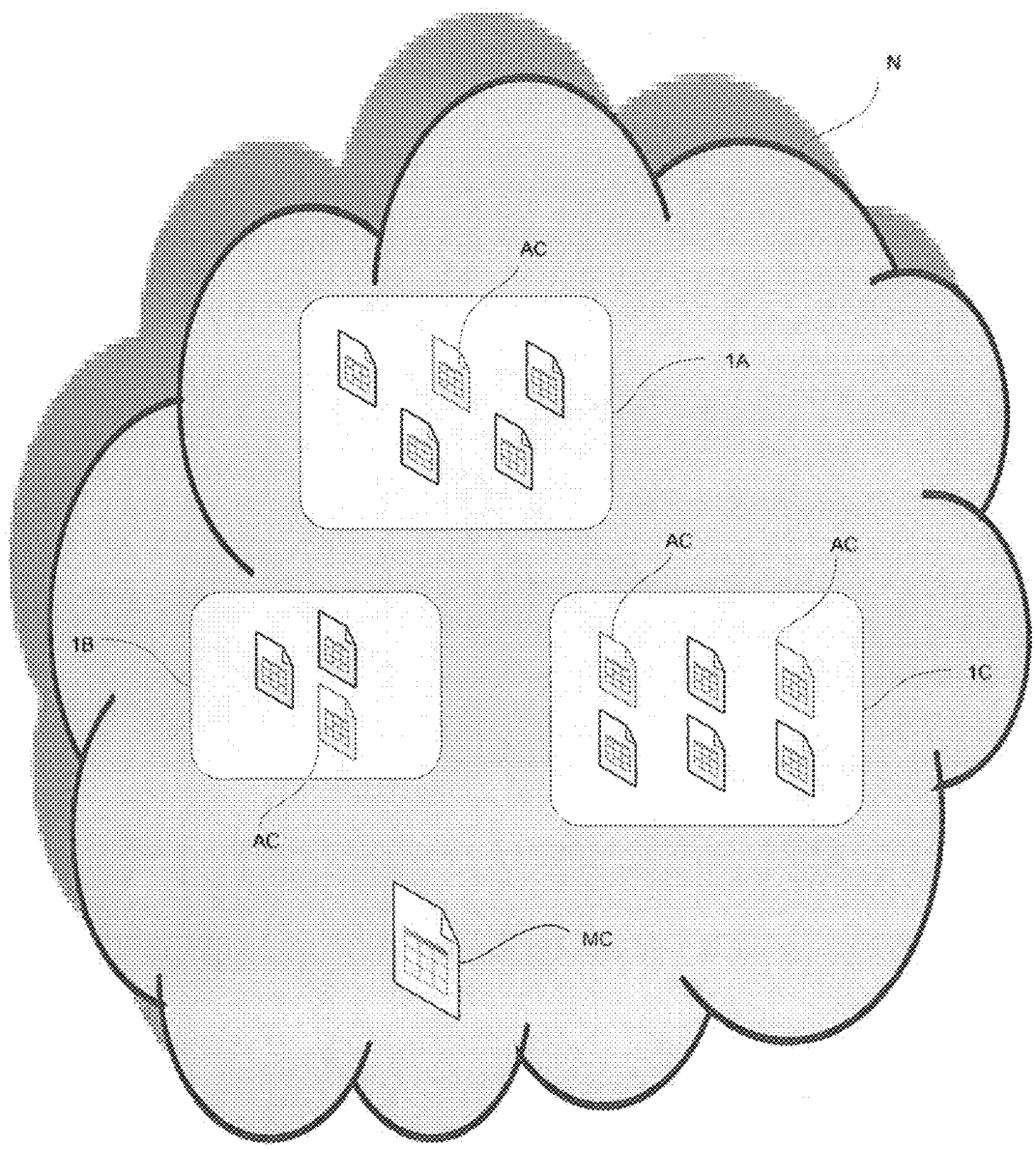
FIG. 1 represents a main multimedia content and auxiliary multimedia contents distributed over a network, both main and auxiliary multimedia contents being related to a given object.

In the Figures, alike reference numerals refer to alike parts, unless otherwise indicated.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery and/or treatment methods and systems.

In the following specification, as described in FIG. 1, it is considered a main multimedia content MC related to a given object (such as a movie, an audio content like a song, a written article, a book, etc.) and auxiliary multimedia contents AC related to the same given object. The main and auxiliary multimedia contents MC and AC are initially published over the Internet network N on dedicated websites, particular web forums, etc. (associated with references 1A, 1B, 1C on FIG. 1). They might be retrieved from Internet thanks to already well known retrieval techniques, in order to be subsequently processed by a device D hereinafter described in relation with FIG. 2.

It should be understood that a multimedia content (main MC or auxiliary AC content) may be as diverse as a movie review, an A/V content (as a video clip), a story, a report (for example a sport match report), etc.

In addition, it is assumed that the main multimedia content MC does not comprise any time information, whereas auxiliary contents do. For instance, the time information associated with each auxiliary content is its release date on the network N. Obviously, in a variant, any other kind of time information might be used.

The device D—adapted for assigning time information to the main multimedia content MC—may be a client terminal, connected for instance to a gateway through a home network or an enterprise network, which may wish to request a main multimedia content stored on a remote server S through the Internet network N. As an example, the device D might be a portable media device, a mobile phone, a tablet, a laptop, etc.

Figure 2:
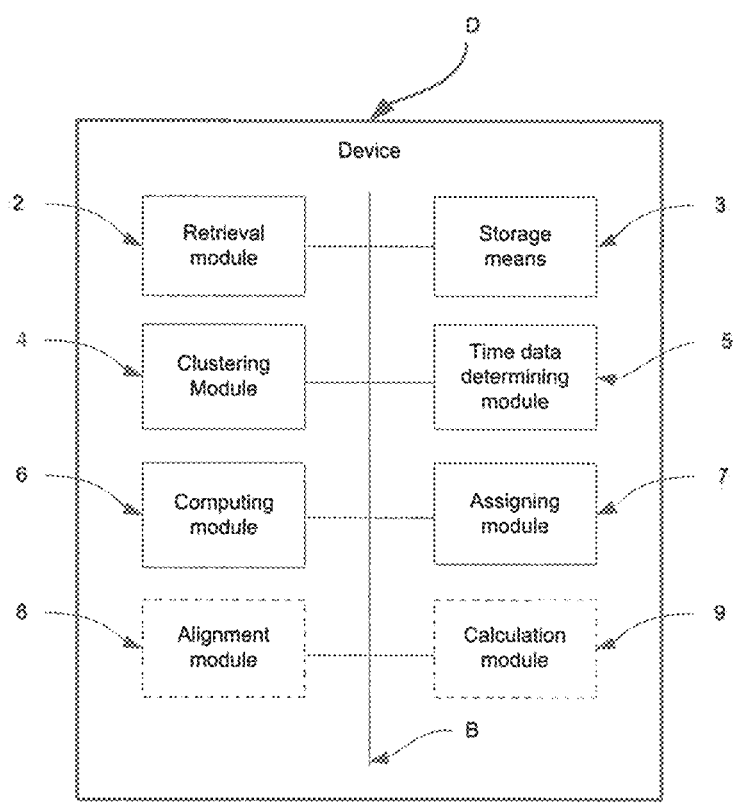
FIG. 2 is a block diagram of a device configured for assigning time information to the main multimedia content of FIG. 1, according to a preferred embodiment compliant with the present invention.

According to a preferred embodiment of the present invention shown on FIG. 2, the device D comprises a retrieval module 2 adapted to retrieve from the network N and to store in a storage means 3 (such as a non-volatile memory) the set of auxiliary contents AC related to the same object as the main multimedia content MC (assumed for instance to be previously stored in the device D upon a user action).

In addition, the device D comprises a clustering module 4 which is adapted to deliver clusters from the set of auxiliary multimedia contents AC. In particular, the clustering module 4 implements a temporal clustering algorithm based on the release date of the auxiliary multimedia contents and their own content (such as words, phrases and combinations of phrases). An example of such an algorithm is described in "Dynamic topic models", Blei, D. M., & Lafferty, J. D. (2006), ICML'06—23rd International Conference on Machine Learning (pp. 113-120).

Note that obviously other kinds of clustering algorithms might be used, such as K-means or hierarchical clustering algorithms. Optionally, additional metadata information may also be processed by the clustering module 4.

The device D further comprises a determining module 5 able to determine a time data for each cluster obtained by the clustering module 4. More particularly, to each obtained cluster, the determining module 5 can calculate the mean time of the release date of the auxiliary multimedia contents AC belonging to said cluster, so as to assign the calculated mean time to the cluster. In addition, the determining module 5 may also compute the standard deviation within each cluster determined by the clustering module 4. In this case, the time data assigned to each cluster should be independent of any single member of said cluster.

In a variant, the time information of an auxiliary multimedia content might be the release date of an additional multimedia content associated with said auxiliary content, or a time data manually attached to said additional multimedia content.

In a further variant, the determining module 5 might implement other algorithms to calculate a time data for each cluster, such as the Medoid algorithm defining a Medoid point or the Centroid algorithm specifying a Centroid point.

Besides, the device D also comprises a computing module 6 which is configured to compute a distance (as a criterion of similarity) between the main multimedia content MC and each of the determined clusters, so as to determine a similarity. The computed value of the distance is anyway inversely proportional to the degree of similarity.

For a given cluster, the computing module 6 may use features such as words, phrases, combinations of phrases, sounds, video clips, etc., appearing in the main multimedia content MC and in the auxiliary multimedia contents AC of said cluster, in order to link the topic disclosed in the main content MC to the given cluster. Optionally, additional metadata might also be used.

For each cluster, the distance can be estimated by comparing a features set (such as a n-tuple) of the main multimedia content MC with the corresponding features set of the auxiliary multimedia contents AC of said cluster. Since the main content MC and the auxiliary contents AC are characterized by the exact same set of features, any kind of distance measure applied to these sets of values can be used, e.g. Euclidian distance, Manhattan distance, min or max difference between two feature values, etc.:

Euclidian distance: $\text{dist}_{euclidian} = \sqrt{\Sigma_{i<n}(x_i - x'_i)^2}$ Manhattan distance: $\text{dist}_{manatthan} = \Sigma_{i<n}|x_i - x'_i|$ Max difference: $dist_{max} = \arg\max_{i<n}(|x_i - x'_i|)$ where $x_i$ (respectively $x'_i$) is a numerical feature value for a multimedia content creator x (respectively creator x') among n features.

It should be appreciated that, due to the possibly considerable difference in length of the main and auxiliary contents MC and AC, a content length normalization technique may be preliminarily implemented by the computing module 6, as the one described in "Pivoted document length normalization", Amit Singhal, Chris Buckley, and Mandar Mitra, 1996, Proceedings of the 19th annual international ACM SIGIR conference on Research and development in information retrieval.

The device D further comprises an assigning module 7 for assigning to the main multimedia content MC the time data of the cluster having the smallest distance amongst said computed distances. In other words, the time data of the cluster having the highest degree of similarity (namely the smallest computed distance) with the main multimedia content MC is assigned to said content MC.

Furthermore, the device D can optionally comprise an alignment module 8 adapted to determine a time interval between the release date of the given object and the assigned time data of the main multimedia content MC.

Thus, by considering several main multimedia contents MC created by a common creator and related to different objects, the alignment module 8 might use the release date of these objects as an offset to subtract it from the time data assigned to each associated main multimedia contents MC. Therefore, all main multimedia contents MC might be positioned on the same relative timeline, the origin of which corresponding to the release date of the objects.

Moreover, the device D can also comprise a calculation module 9 able to compute, for a given creator, the mean position of the positions associated with the main multimedia contents MC of said given creator, so as to associate a temporal attribute to the behavior of said creator. As a result, by considering several creators, the device D can project said creators on a common relative timeline, in order to compare them based on their position on the relative timeline.

As shown on FIG. 2, the device D also comprises an internal bus B to connect the various modules and all means well known to the skilled in the art for performing the generic functionalities of the device D.

The modules of device D might be driven by a microprocessor of a processing unit (not shown on FIG. 2).

As an illustrative but non limitative example, the given object is a movie associated with a release date. Each movie is attached to a set of related articles (aka professional review articles). Each article—which corresponds to a main multimedia content—is written by a known creator (or author). Publication dates may or may not be attached to said articles. Each movie is also associated with a set of related comments (corresponding to the auxiliary multimedia contents, previously specified), which are user comments posted on a dedicated forum. The publication date is the time information known for each comment.

It is then allowed to identify (for instance on a dedicated display of the device D, not represented on FIG. 2) the creators who are close to time zero, meaning that they tend to use similar words as Web users providing comments just after the release date of movies, in case the main and auxiliary multimedia contents are written comments. This temporal attribute can contribute to the description of the author's behavior. For example, it allows to distinguish between creators who write in a similar manner as first contributors to an online forum (early adopters of a new product, early fans of a movie, etc.), and creators who often lag behind. One possible use of this approach is the automatic discovery of mavens (universal sources of information for everyone else) and innovators. This might also help to distinguish between creators whose reviews should be more interesting for Web users when published right before the release date, right after, or in the long term (months after the release date).

Figure 3:
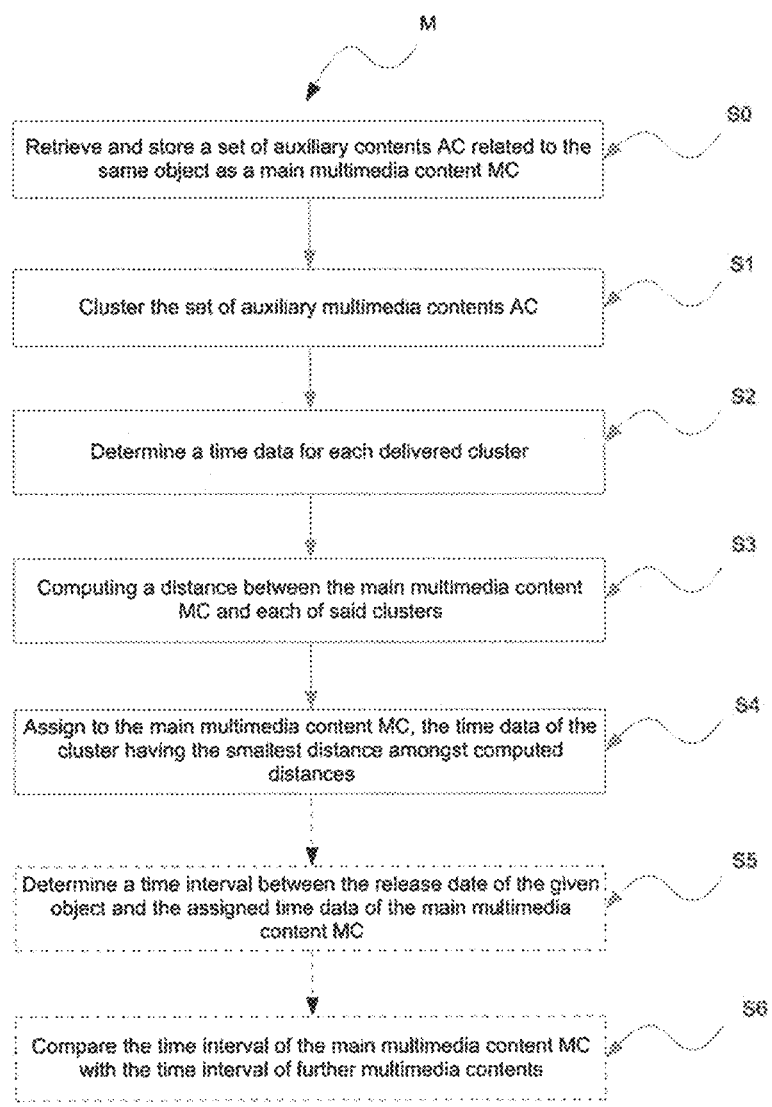
FIG. 3 is a flow chart illustrating the method for assigning time information to the main multimedia content implemented by the device depicted on FIG. 2.

Besides, according to the invention and as shown in FIG. 3, the device D is configured to implement the method M for assigning time information to a main multimedia content MC related to a given object, said method M comprising the following steps of:

retrieving and storing (step S0) a set of auxiliary contents AC related to the same object as the main multimedia content MC;

clustering (step S1) the set of auxiliary multimedia contents AC with time information and related to said object, so as to deliver clusters. The clustering step S1 preferably implements a temporal clustering algorithm as previously described and can be based on the release date of the auxiliary multimedia contents AC and their own content;

determining (step S2) a time data for each delivered cluster;

computing (step S3) a distance between the main multimedia content MC and each of said clusters;

assigning (step S4) to the main multimedia content MC, the time data of the cluster having the smallest distance amongst said computed distances.

Optionally, the method M can further comprise the steps of:

determining (step S5) a time interval between the release date of the given object and the assigned time data of the main multimedia content MC; and comparing (step S6) the time interval of the main multimedia content with the time interval of further multimedia contents created or not by the same creator as the main content MC, and related or not to the same object.

As will be appreciated by one skilled in the art, aspects of the present principles can be embodied as a method, a device, a computer readable medium or a computer program product.

Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system", the whole being embedded in a single device or in many devices that are connected together by any kind of means. Furthermore, aspects of the present principles can take the form of a computer readable storage medium. Any combination of one or more computer readable storage medium(s) may be utilized.

References disclosed in the description, the claims and the drawings may be provided independently or in any appropriate combination. Features may, where appropriate, be implemented in hardware, software, or a combination of the two.

Reference numerals appearing in the claims are by way of illustration only and shall have no limiting effect on the scope of the claims.

This invention having been described in its preferred embodiment, it is clear that it is susceptible to numerous modifications and embodiments within the ability of those skilled in the art and without the exercise of the inventive faculty. Accordingly, the scope of the invention is defined by the scope of the following claims.

In the claims hereof, any element expressed as a means for performing a specified function (e.g. the retrieval module 2, clustering module 4, the determining module 5, the computing module 6, the assigning module 7, the alignment module 8, the calculation module 9, etc.) is intended to encompass any way of performing that function including, for example, a) a combination of circuit elements (for instance one or more processors) that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

The invention claimed is:

1. Method for assigning time information to a main multimedia content related to a given object, the main multimedia content does not already have associated time information, comprising:
    clustering a set of auxiliary multimedia contents with time information and related to said object, so as to deliver clusters; determining a time data for each cluster;
    computing a distance between the main multimedia content and each of said clusters,
    assigning to the main multimedia content, the time data of the cluster having the smallest distance amongst said computed distances to be the associated time information for the main multimedia content.

2. Method according to claim 1, wherein the clustering implements a temporal clustering algorithm.

3. Method according to claim 2, wherein the clustering is based on the release date of the auxiliary multimedia contents and their own content.

4. Method according to claim 1, wherein the determined time data of each cluster is the mean time obtained from the time information of the auxiliary multimedia contents defining said cluster.

5. Method according to claim 1, comprising determining a time interval between the release date of the given object and the assigned time data of the main multimedia content.

6. Method according to claim 5, comprising comparing the time interval of the main multimedia content with the time interval of at least one further multimedia content.

7. Method according to claim 1, wherein the main and auxiliary multimedia contents are initially released on a network, and then retrieved from said network.

8. Device for assigning time information to a main multimedia content related to a given object, the main multimedia content does not already have associated time information, comprises:
    a clustering module configured to cluster a set of auxiliary multimedia contents with time information and related to said object, so as to deliver clusters comprising some of said auxiliary multimedia contents;
    a determining module configured to determine a time data for each cluster; a computing module configured to compute a distance between the main multimedia content and each of said clusters,
    an assigning module configured to assign to the main multimedia content, the time data of the cluster having the smallest distance said amongst computed distances to be the associated time information for the main multimedia content.

9. Device according to claim 8, wherein the clustering module implements a temporal clustering algorithm.

10. Computer program product downloadable from a communication network and/or recorded on a non-transitory medium readable by computer and/or executable by a processor, comprising program code instructions for implementing the steps of a method according to claim 1.

11. Non-transitory computer-readable medium comprising a computer program product recorded thereon and capable of being run by a processor, including program code instructions for implementing the method according to claim 1.

12. Device for assigning time information to a main multimedia content related to a given object, the main multimedia content does not already have associated time information, comprising a microprocessor configured to:
    cluster a set of auxiliary multimedia contents with time information and related to said object, so as to deliver clusters;
    determine a time data for each cluster;
    compute a distance between the main multimedia content and each of said clusters; and
    assign to the main multimedia content, the time data of the cluster having the smallest distance amongst said computed distances to be the associated time information for the main multimedia content.

* * * * *